United States Patent [19]
Rooks

[11] 3,879,583
[45] Apr. 22, 1975

[54] RECONSTRUCTION OF TELEPHONE DIAL SIGNALS

[75] Inventor: Ernest F. Rooks, El Monte, Calif.

[73] Assignee: K'Son Corporation, Orange, Calif.

[22] Filed: Aug. 17, 1973

[21] Appl. No.: 389,238

[52] U.S. Cl. .............. 179/16 E; 328/164
[51] Int. Cl. .............. H04q 1/36
[58] Field of Search .......... 179/16 E, 16 EA, 16 F; 178/70 R, 70 TS; 328/146, 149, 164; 307/132 R, 132 M

[56] References Cited

UNITED STATES PATENTS

| | | | |
|---|---|---|---|
| 2,428,011 | 9/1947 | Chatterjea et al. | 328/164 |
| 3,384,711 | 5/1968 | Boxall | 178/70 R |
| 3,504,290 | 3/1970 | Earle | 179/16 EA |
| 3,569,739 | 3/1971 | Stolman | 328/146 |
| 3,790,894 | 2/1974 | Iizuka et al. | 328/164 |

*Primary Examiner*—Kathleen H. Claffy
*Assistant Examiner*—Randall P. Myers
*Attorney, Agent, or Firm*—Philip M. Hinderstein

[57] ABSTRACT

Apparatus for the reconstruction of a telephone dial signal of the type consisting of a series of interruptions of a DC signal on a conventional telephone line. The present apparatus receives signals from the telephone line, continuously generates and sustains a reference voltage level which is a fixed percentage of the peak value of the received signal, provides an output whenever the received signal level exceeds the reference voltage level whereby one or more outputs occur at the beginning and at the end of each interruption of the dial signal, converts multiple outputs ocurring at the beginning and at the end of each interruption into unitary output signals, and passes a single output signal for each interruption of the dial signal, the receiving station thereby having an accurate indication of the original dialed information.

9 Claims, 2 Drawing Figures

RECONSTRUCTION OF TELEPHONE DIAL SIGNALS

BACKGROUND OF THE INVENTION

1. Field of the Invention

The present invention relates to the reconstruction of telephone dial signals and, more particularly, to apparatus for receiving a dialed signal over a conventional telephone line and for accurately reconstructing the original dialed information.

2. Description of the Prior Art.

In the rapidly expanding field of pay cable television, it is common for a cable television service to provide, at any given time, several television programs for receipt by its subscribers. The individual subscribers then have the option of selecting any one or none of the available programs and are charged only on the basis of those programs actually received.

Accordingly, one of the biggest problems in this area is the technique utilized by the subscriber to select a desired program. Typically, the cable television service is connected to each television set in a manner such that it determines what program the subscriber receives. Therefore, one common technique utilizes the principle of subscription whereby each subscriber is sent a listing of all future programs and the subscriber must select the desired programs, in advance, and forward his order to the cable television service. Thus, when the programs selected by the subscriber are transmitted, the service activates the subscriber's television receiver.

As an alternative to this procedure, it has also been proposed to sell tickets of a type which the subscriber may purchase in a local store and then insert into a device associated with his television receiver, which ticket will activate the receiver to show the program purchased.

Both of these techniques are designed to avoid the undesirable initial practice of having the subscriber insert coins into a register attached to the television receiver. While this former procedure had the advantage of permitting the subscriber to select a program at any moment, it created the substantial problem of requiring the service to make continued visits to each subscriber's home to collect the money in the coin register. With the first described system, this problem is avoided because the service can bill the subscriber on a monthly basis for the programs received. This problem is also avoided with the second described system because the ticket selling establishment can forward the receipts to the cable television service.

While both of these systems, and others, solve the receipt collection problem, they have a significant disadvantage associated therewith. More specifically, these systems and others require the subscriber to select, in advance, the programs that he is to receive. However, studies have shown that subscribers are larely unwilling to do this because they do not always know, in advance, when they will desire to receive television programs. Thus, a far more desirable system is one which enables the subscriber, on the spur of the moment, to order a particular program which is then available.

There is, therefore, presented the requirement of providing each subscriber with a method of communicating with the cable television service. While the actual cable television lines would appear to be ideally suited for this purpose, they are typically one-way lines, permitting communication only from the service to the subscriber and not vice versa. It has, therefore, been suggested that the telephone lines be used whereby a subscriber may simply pick up a telephone, call the cable television service, and order a particular program. The cable television service will then transmit over their lines a signal which will activate the particular subscriber's television receiver.

Two approaches have been suggested for such a system. In the first instance, a series of operators could be provided for taking the incoming calls and for controlling the transmission equipment. However, this approach has the disadvantage of requiring a large number of operators and is, therefore, too expensive to be practical. Alternatively, the incoming phone lines can be coupled to a computer which would automatically handle all incoming calls. The subscriber would dial the service and his telephone would be connected into the computer. The subscriber would then dial a series of numbers, which numbers would indicate who the subscriber is and exactly his request. By completely automating this system, it could be made inexpensive and practical.

Unfortunately, such a system has not been implemented heretofore because of the problem of transmitting dial signals over a conventional telephone line. The telephone dial produces digital signals by generating a number of interruptions of the direct current present on the telephone lines. The number of interruptions is a function of the digit dial. However, because of the limited passband of the public dial-up telephone lines, typically 300 to 3,000 Hz, the interrupted DC signals produced by the telephone dial at the transmitting end will result in random energy bursts at the receiving end, one burst at the beginning and one at the end of each DC interruption. The amplitude and frequency content of these bursts may vary considerably from line to line and may be accompanied by noise, voice, and other signals. Thus, the received signal is generally unsuitable for further processing in a computer.

SUMMARY OF THE INVENTION

According to the present invention, these problems are solved by providing apparatus for receiving a dial signal over a conventional telephone line and for reconstructing the original dialed information thereby making available signals suitable for digital processing. With the present system, full implementation of the advantages of cable television may be achieved by not only solving the receipt collection problem but by enabling a subscriber to order a particular program at any time. With the present system, the subscriber would dial the cable television service and his telephone would automatically be connected into a computer. The subscriber would then dial a series of numbers, which numbers would indicate who the subscriber is and exactly his request. The present system receives the dialed signal from the telephone line and generates a pulse at the end of each interruption of the dial signal. These pulses may be readily counted and placed in a format suitable for processing by the computer.

Briefly, the present apparatus for reconstructing a telephone dial signal of the type consisting of a series of interruptions of a DC signal on a conventional telephone line comprises means for receiving signals from the telephone line, means for continuously generating and sustaining a reference voltage level which is a fixed percentage of the peak value of the received signal, means for providing an output, on a real time basis, whenever the received signal level exceeds the reference voltage level, one or more outputs occurring at the beginning and at the end of each interruption of the dial signal, means for converting multiple outputs occurring at the beginning and at the end of each interruption into unitary output signals occurring at the beginning and at the end of each such interruption, means for generating a gating signal a predetermined time interval after each output signal, the time interval corresponding to the duration of the interruption of the dial signal, and gating means for passing only those output signals which occur during a gating signal, each of the passed output signals representing the end of an interruption of the dial signal.

OBJECTS

It is therefore an object of the present invention to provide a system for the reconstruction of telephone dial signals.

It is a further object of the present invention to provide apparatus for receiving a dial signal over a conventional telephone line and for accurately reconstructing the original dialed information.

It is a still further object of the present invention to provide apparatus for converting signals received over a conventional telephone line into a form suitable for processing by a computer.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
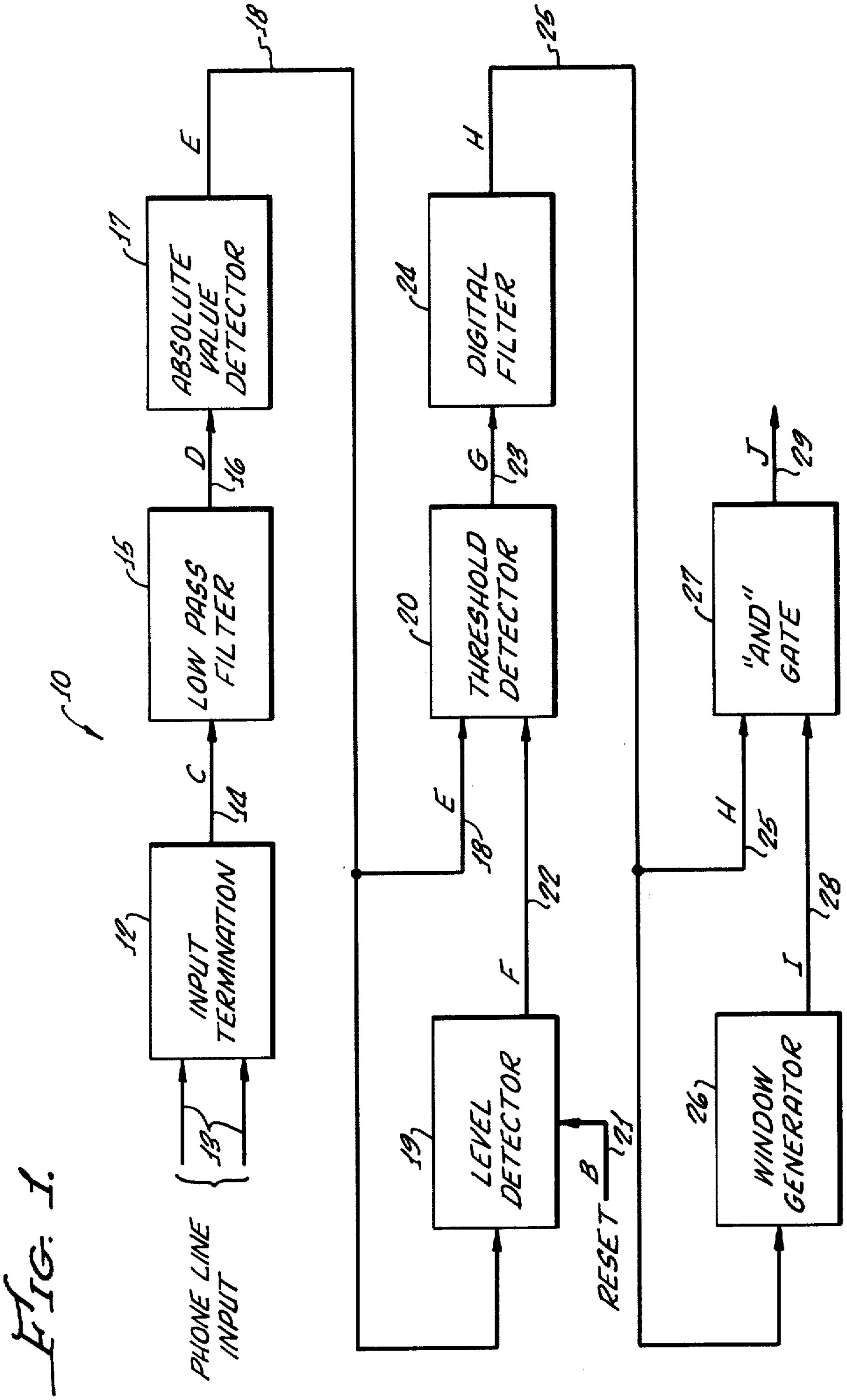
FIG. 1 is a block diagram of a preferred embodiment of apparatus for receiving a dialed signal over a conventional telephone line and for accurately reconstructing the original dialed information.

Referring now to the drawings and, more particularly, to FIG. 1 thereof, there is shown apparatus, generally designated 10, for reconstructing a telephone dial signal. Apparatus 10 includes an input termination 12, having an input connected to the incoming phone lines 13, which provides a suitable balanced termination therefor. The output of termination 12, on a line 14, is applied to a low pass filter 15, the output of which, on a line 16, is applied to an absolute value detector 17. Absolute value detector 17 may be a full wave rectifier of known configuration.

The output of absolute value detector 17, on a line 18, is applied to a level detector 19 and to a threshold detector 20. Level detector 19 generates a reference voltage level which is a fixed percentage of the peak value of the signal on line 18, which reference voltage level will be sustained for a sufficiently long period of time to allow for normal pauses between dialed numbers. Level detector 19 also receives an input over a line 21 which resets the reference voltage level to zero.

The output of level detector 19, on a line 22, is applied as a second input to threshold detector 20. Threshold detector 20 provides an output, on a line 23, whenever the received signal level on line 18 exceeds the reference voltage level on line 22. Since threshold detector 20 may provide multiple outputs at the beginning and at the end of each interruption of a dial signal, the output thereof, on a line 23, is applied to a digital filter 24. Filter 24 may consist of a retriggerable digital one-shot multivibrator with its timing elements chosen to give a unitary output pulse in response to the multiple signals contained in one dialed burst.

The output of digital filter 24, on a line 25, is applied to a window generator 26 and to one input of a two-input AND gate 27. Window generator 26 may be a multivibrator for generating a gating signal on a line 28 a predetermined time interval after each output signal on line 25, such time interval corresponding to the duration of the interruption of a dial signal. The signal on line 28 is applied to the other input of gate 27 which passes to an output line 29 only those output signals on line 25 which occur during a gating signal on line 28. The resultant output signals on line 29 represent the end of each interruption of the dial signal and may be then transferred to suitable counting and processing apparatus and then to a suitable computer.

OPERATION

Figure 2:
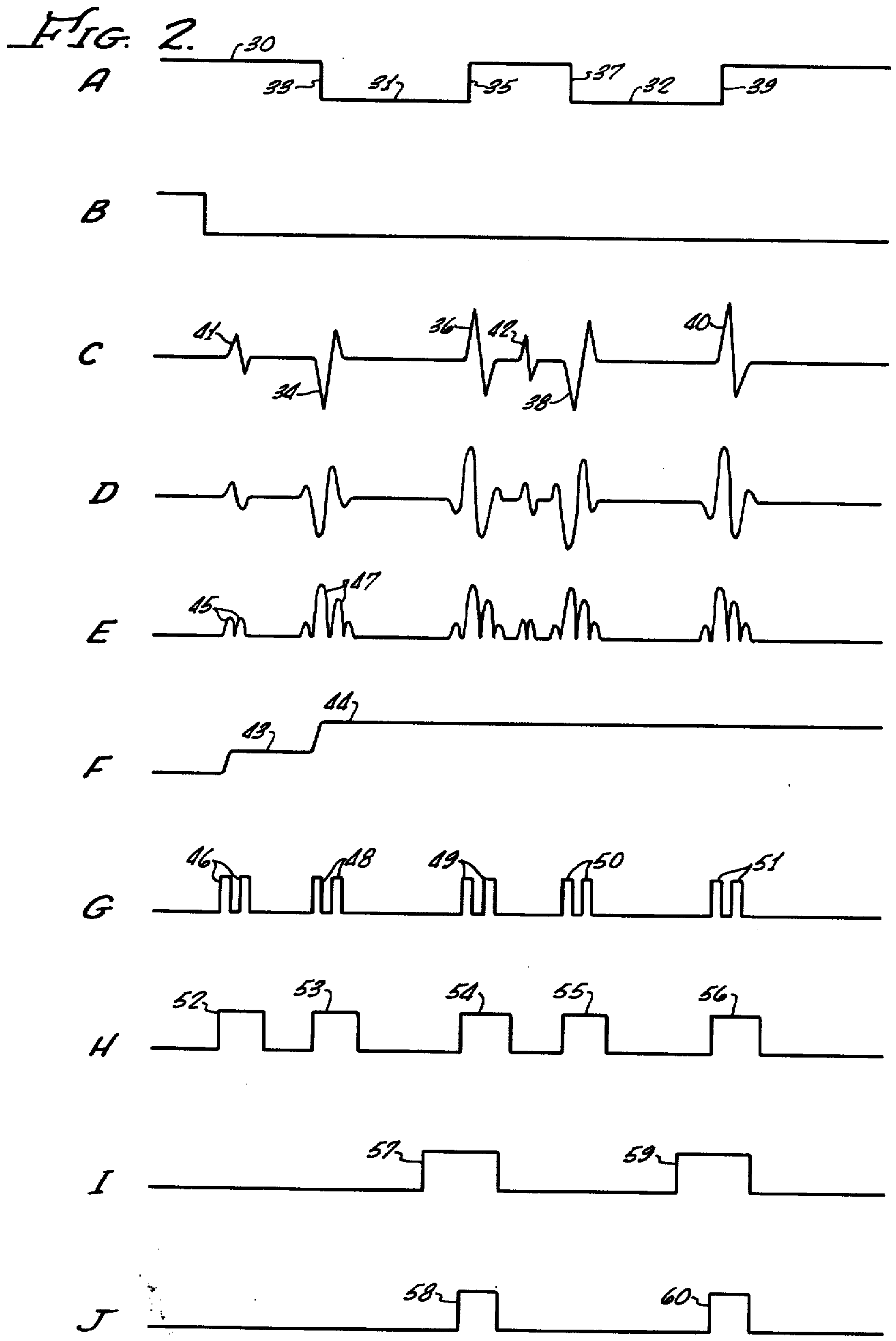
FIG. 2 is a series of waveforms useful in explaining the operation of the system of FIG. 1.

The operation of apparatus 10 will now be described with reference to the waveforms of FIG. 2 within a typical telephone dial signal of the type consisting of a series of interruptions of a DC signal on a conventional telephone line is shown as waveform A. The reset signal applied on line 21 to level detector 19 is shown as waveform B and the outputs of input termination 12, low pass filter 15, and absolute value detector 17 are shown as waveforms C, D, and E, respectively. The reference voltage level generated by level detector 19, on line 22, is shown as waveform F and the outputs of threshold detector 20 and digital filter 24 are shown as waveforms G and H, respectively. The gating signal generated by window generator 26, on line 28, is shown as waveform I and the output pulses from AND gate 27, on line 29, are shown as waveform J.

The telephone dial produces digital signals by generating a number of interruptions of the direct current present on the telephone lines. The number of interruptions is a function of the digit dialed. Thus, the normal DC signal on a conventional telephone line, indicated at 30 in waveform A, is interrupted twice, at 31 and 32, when the digit 2 is dialed.

Because of the limited passband of the public telephone lines, typically 300 to 3,000 Hz, the interrupted DC signals produced by the telephone dial at the transmitting end will result in random energy bursts at the receiving end, one burst at the beginning and one at the end of each DC interruption. Thus, at the beginning of interruption 31, as shown at 33 in waveform A, the receiving end receives an energy burst consisting of a series of spikes, as shown at 34 in waveform C. Similarly, at the end of interruption 31, as shown at 35 in waveform A, an energy burst will be received at the receiving end, as shown at 36 in waveform C. Similarly, the beginning and end of interruption 32, as shown at 37 and 39, respectively, in waveform A, will result in energy bursts at the receiving end, as shown at 38 and 40, respectively, in waveform C.

The amplitude and frequency content of these bursts may vary considerably from line to line and may be accompanied by noise, voice, and other signals. Thus, noise bursts may appear at the receiving end interposed between the energy bursts resulting from the dial signal, as shown at 41 and 42 in waveform C. Apparatus 10 reconstructs the original dialed information from the dial bursts at the receiving end and makes available signals suitable for digital processing.

Input termination 12 provides a suitable balanced termination for the incoming phone lines 13 and couples the signal to low pass filter 15. Since most of the energy of a differentiated step function, such as a dial interruption period, is present in the low end of the transmission passband, low pass filter 15 serves to allow the fundamentals of the dial bursts to pass while the voice and noise signals are attenuated. Since the dial bursts at this point may contain both positive and negative going signals, as shown in waveforms C and D, the dial bursts at the output of filter 15 are transformed to an all positive going signal by absolute value detector 17.

Level detector 19 and threshold detector 20 serve to eliminate the noise pulses appearing at the output of absolute value detector 17. Thus, level detector 19 serves to provide a sustained reference voltage level which is some fixed proportion of the peak value of its most recent input level. This is effective in rejecting noise pulses which are inevitably lower than dial pulses, but could come in advance of dial pulses. Waveforms C, D, and E depict a situation where a noise pulse 41 occurs immediately prior to the first dial interruption 31 and where a noise pulse 42 occurs immediately after the first dial interruption 31. Level detector 19, having been reset by a signal on line 21, generates a reference voltage level on line 22, as seen at 43 in waveform F, which is a fixed proportion of the peak value of noise pulse 41. When the first dial burst occurs, as shown at 34 in waveform C, the output of level detector 19, on line 22, rises to a higher level, as shown at 44 in waveform F, which is a fixed proportion of the peak value of dial burst 34.

Threshold detector 20 compares the received signal level from absolute value detector 17, on line 18, with the reference voltage level provided by level detector 19, on line 22, and provides an output whenever the received signal level exceeds the reference voltage level. Thus, the multiple spikes appearing at the output of absolute value detector 17, as shown at 45 in waveform E, as a result of noise pulse 41, appear as multiple output pulses at the output of threshold detector 20, as shown at 46 in waveform G. Similarly, those spikes at the output of absolute value detector 17, as shown at 47 in waveform E, as a result of energy burst 34, which exceed the reference voltage level from level detector 19, generate multiple output pulses at the output of threshold detector 20, as shown at 48 in waveform G. Similar multiple pulses, as shown at 49, 50, and 51 in waveform G, occur at the output of threshold detector 20 for the energy bursts shown at 36, 38, and 40, respectively, in waveform C. It should, however, be noted, that all noise pulses after the first noise pulse 41 are completely rejected since they are always lower in magnitude than the dial pulses and lower than reference voltage level 44.

Threshold detector 20 may be a device which will output a logical 1 signal level when its input level exceeds its reference level. The ratio of the reference level to the signal level is such that the threshold detector will not respond to lower level voice and noise signals. A typical value for this ratio is two-thirds.

Since threshold detector 20 may generate multiple output pulses for each dial burst, as shown in waveform G, digital filter 24 is provided so as to convert these multiple outputs occurring at the beginning and at the end of each interruption of the dial signal into unitary output signals. Digital filter 24 may consist of a one-shot multivibrator with its timing elements chosen to give a single logical 1 level in response to the multiple pulses contained in one dial burst and a logical 0 level between dial bursts. Thus, the multiple output pulses shown at 46, 48, 49, 50, and 51 in waveform G are converted to unitary output signals, as shown at 52-56, respectively, in waveform H.

The output of digital filter 24, therefore, consists of two logical 1 pulses, one from the burst at the beginning of each interruption of the dial signal and one from the burst at the end of each interruption of the dial signal. Since this represents twice as many pulses as is necessary or desirable, window generator 26 and AND gate 27 operate to pass only a single output signal for each interruption of the dial signal. More specifically, window generator 26 is a device which, in response to a transition from a logical 0 to a logical 1 at its input, will generate a gating signal after a predetermined time interval. This time interval is set to correspond to the duration of the dial interruption period. Thus, if started by a pulse derived from the burst which resulted from the start of a dial interruption period, the gating signal will occur at the time of the pulse which signifies the end of the same dial interruption period. On the other hand, if a false pulse should start the timing period slightly early, the desired pulse will reset the timer and a new time period begins. Once the gating signal is generated, window generator 26 ignores any signals at its input until the gating signal is ended. Furthermore, the width of the gating signal is sufficient to allow for the timing tolerances of the dial interruption period.

The output signal shown at 52 in waveform H, resulting from noise pulse 41, starts the time interval of window generator 26. Since output pulse 53, resulting from the start of dial interruption period 31, occurs before the gating pulse, the time period is restarted and pulse 53 does not pass through AND gate 27. On the other hand, no other pulse occurs until pulse 54, resulting from the end of dial interruption period 31, and window generator 26 generate a gating signal, as shown at 57 in waveform I, so as to coincide with pulse 54. Upon the simultaneous occurrence of pulses 54 and 57 at the two inputs of AND gate 27, a single pulse appears on line 29 at the output thereof, as shown at 58 in waveform J.

Since pulse 54 occurred during gating signal 57 from window generator 26, it does not reset generator 26. Generator 26 is reset by the next pulse from digital filter 24, as shown at 55 in waveform H, and generates a second gating signal, as shown at 59 in waveform I, so as to coincide with the pulse at the output of filter 24 which signifies the end of dial interruption period 32, as shown at 56 in waveform H. As a result, a second pulse occurs at the output of AND gate 27 during the simultaneous occurrence of signals 56 and 59, as shown at 60 in waveform J.

In apparatus 10, there is always the possibility that a noise pulse, such as pulse 41, will occur prior to the first dial interruption pulse and that this pulse will appear at the output of gate 27. Therefore, it is advisable, to insure maximum reliability in applying apparatus 10, to employ a set-up digit ahead of the digits in which integrity is most critical. If this is done, the set-up digit will insure that the reference output of level detector 19 is sufficiently high to exclude or override subsequent noise pulses. On the other hand, the set-up digit need not be totally wasted because the probability that noise would occur in precise synchronism with dial pulses is extremely low. Therefore, it is reasonable to assume that odd numbered set-up digits, such as 3, 5, 7, and 9 can be easily distinguished by subtracting one from each even numbered digit since an even numbered digit can only occur when the dial interruption data train was preceded by a single noise pulse.

Once the first desired pulse arrives, the probability of another false pulse is extremely remote since dial generated bursts typically contain far greater energy than the noise sources. Therefore, once the first desired pulse sets the reference output of level detector 19 to a high level, such lower energy false pulses will not pass through threshold detector 20.

The result is that AND gate 27 functions to pass only the logical 1 pulses which represent the end of each dial interruption period. With the original dialed signal reconstructed to produce a single pulse for each dial interruption, these pulses can be readily counted and processed reliably in data processing apparatus well known to those skilled in the art.

While the invention has been described with respect to a preferred physical embodiment constructed in accordance therewith, it will be apparent to those skilled in the art that various modifications and improvements may be made without departing from the scope and spirit of the invention. For example, while the present apparatus for reconstructing telephone dial signals has been described for use in its preferred embodiment, namely for the transmission of subscriber requests in a cable television system, it will be apparent to those skilled in the art that the present system has applicability in any system where information is transmitted over public telephone lines. Accordingly, it is to be understood that the invention is not to be limited by the specific illustrative embodiment, but only by the scope of the appended claims.

I claim:

1. Apparatus for reconstructing a telephone dial signal of the type consisting of a series of interruptions of a DC signal on a conventional telephone line comprising:

means for receiving signals from said telephone line;

means responsive to said receiving means for continuously generating and sustaining a reference voltage level which is a fixed percentage of the peak value of said signals received from said telephone line;

means responsive to said receiving means and said reference voltage level generating means for providing an output, on a real time basis, whenever said received signal level exceeds said reference voltage level, at least one output occurring at the beginning and at the end of each interruption of said dial signal; and means responsive to said output providing means for converting multiple outputs occurring at the beginning and at the end of each interruption of said dial signal into unitary output signals occurring at the beginning and at the end of each said interruption.

2. Apparatus according to claim 1 further comprising:

low pass filter means interposed between said receiving means and said reference voltage level generating means.

3. Apparatus according to claim 1 further comprising:

full wave rectifier means interposed between said receiving means and said reference voltage level generating means.

4. Apparatus according to claim 1 wherein said reference voltage level is approximately two-thirds of the peak value of said received signal.

5. Apparatus according to claim 1 further comprising:

means responsive to said converting means for passing a single output signal for each interruption of said dial signal.

6. Apparatus according to claim 5 wherein said passing means comprises:

means responsive to said converting means for generating a gating signal a predetermined time interval after each output signal, said time interval corresponding to the duration of said interruption of said dial signal; and gating means responsive to said converting means and said gating signal generating means for passing only those output signals which occur during a gating signal, each of said passed output signals representing the end of an interruption of said dial signal.

7. Apparatus according to claim 1 wherein said output providing means comprises:

detector means for generating a logical 1 signal level whenever said received signal level exceeds said reference voltage level.

8. Apparatus according to claim 7 wherein said converting means comprises:

digital filter means for generating a logical 1 signal level in response to multiple outputs occurring at the beginning and at the end of each interruption of said dial signal and for generating a logical 0 level between such multiple outputs.

9. Apparatus according to claim 8 wherein said digital filter means comprises:

a retriggerable digital one-shot multivibrator.

* * * * *